United States Patent [19]

Katoh

[11] 3,753,531

[45] Aug. 21, 1973

[54] REEL ADAPTER

[75] Inventor: Tomomi Katoh, Nerima-ku, Tokyo, Japan

[73] Assignee: Sansui Electric Co., Ltd., Tokyo, Japan

[22] Filed: Dec. 6, 1971

[21] Appl. No.: 205,235

[30] Foreign Application Priority Data

Dec. 15, 1970 Japan .............................. 45/125145

[52] U.S. Cl. .............................................. 242/68.3

[51] Int. Cl. .............................................. B65h 19/02

[58] Field of Search ............................ 242/68.3, 71.8

[56] References Cited

UNITED STATES PATENTS 2,713,462 7/1955 Camras ............................. 242/68.3

3,275,257 9/1966 Chemiarskyj ...................... 242/71.8

*Primary Examiner*—George F. Mautz

*Assistant Examiner*—Edward J. McCarthy

*Attorney*—Richard C. Sughrue, Donald E. Zinn et al.

[57] ABSTRACT

A reel adapter in the form of an annular plastic insert is received within a center opening of a metal reel whose diameter is not less than 10.5 inches permitting the metal reel to be carried on a reel support normally accommodating a plastic reel of greater thickness but of a diameter not larger than 7 inches, the reel adapter including height adjusting menas of a thickness approximating one-half of the thickness difference between the metal reel and plastic reel, the height adjusting means including at least a radially extending portion which underlies the metal reel to raise the reel above the reel support.

2 Claims, 4 Drawing Figures

REEL ADAPTER

BACKGROUND OF THE INVENTION

1. Field of the Invention

This invention relates to improvements in a reel adapter used in positioning a metal reel of 10.5 inches in diameter on a reel support normally accommodating a plastic reel not greater than 7 inches in diameter of slightly greater thickness.

2. Description of the Prior Art

As well employed in the art, reels for accommodating magnetic tapes in tape recorders and players for tapes of 6.25 millimeters in width are made either of metal or plastic. Where the reels are formed of metal as employed in the manufacture of reels of 10.5 inches in diameter (commonly referred to as No. 10 reels), such reels are slightly less in thickness in contrast to reels formed of plastic as normally employed in the manufacture of reels of 7 inches or less in diameter (referred to generally as No. 7 reels). According to the current international reel standard, the maximum thickness of No. 10 metallic reels is less than the thickness of the No. 7 or smaller plastic reels by approximately 2.2 millemeters. Therefore, when a No. 10 reel is placed on a reel support, the height of which is adjusted so as to normally accommodate a plastic reel, the position of the reel support is too low for the metallic reel so that the magnetic tape is wound up on the reel with the tape biased towards the upper flange of the reel and due to any deformation in the existing flanges, the magnetic tape stretches unevenly during winding.

SUMMARY OF THE INVENTION

The present invention is directed to the solution of the foregoing problem and provides a reel adapter for No. 10 reels used in positioning No. 10 reels on a reel support normally accommodating a No. 7 plastic reel or one of lesser diameter, the present invention being directed to an adjusting member which has provided thereon, means for adjusting the height of the reel, whereby the biasing of the magnetic tape while being wound upon a No. 10 reel under conventional practice is surely amended.

DESCRIPTION OF THE PREFERRED EMBODIMENT

Figure 1:
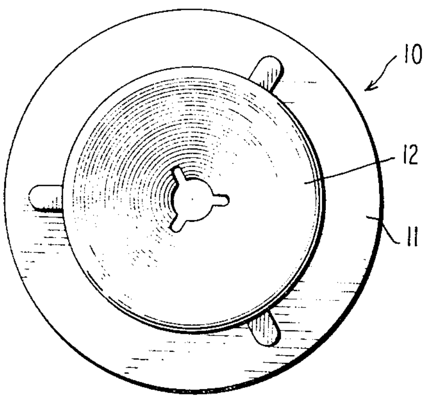
FIG. 1 is a top plan view of one embodiment of the reel adapter according to the present invention.
Figure 2:
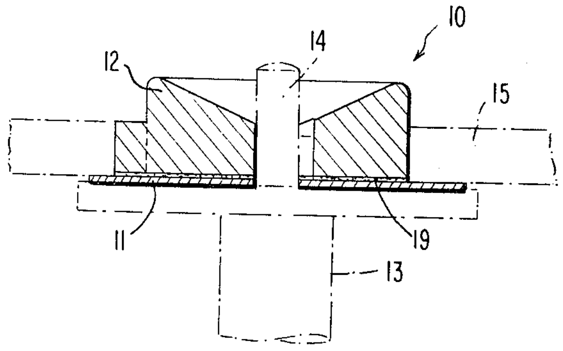
FIG. 2 is a sectional view of the adapter as employed in conjunction with a tape recorder reel support, and a metallic reel supported thereby, as illustrated in broken line fashion.

In explaining one embodiment of the present invention, as shown in FIGS. 1 and 2, an adjusting member 11 having a thickness corresponding to substantially one-half the difference of the thickness between a plastic reel such as a No. 7 reel and a metallic reel such as a No. 10 reel, for example, is illustrated in the form of a doughnut-like board, being 1.1 millimeters in thickness which is secured on a side margin of an adapter body 12 forming an adapter assembly 10 which in FIG. 2 is positioned on a a support 13 and which in turn carries a No. 10 metal reel 15. In the illustrated embodiment, the doughnut-like board 11 is secured to the side of adapter body 12, that is, on the periphery of the adapter body 12, by the use of adhesive such that the bottom surfaces of the board and the body lie in the same plane. Alternatively, it is possible to construct the adjusting member and the adapter body as a single unit.

To place the No. 10 reel on the reel support 13 by the use of the thus constructed reel adapter 10, first, as shown in FIG. 2, the center hole of the reel adapter body 12 is permitted to receive the shaft 14 which extends upwardly from the support surface of the reel support 13 and, then, the reel adapter is moved downwardly so as to contact the reel support 13. Thereafter, the No. 10 metallic reel is fitted about the reel adapter such that the center hole of the reel receives the reel adapter 10. Thus, the reel 15 is supported in raised position at an increased height due to the fact that the height adjusting board 11 lies beneath the reel 15. The reel is maintained higher than the level of the surface of the reel support 13 by a distance of approximately 1.1 millimeters so that the height of the center of the tape winding section of the reel 15 is maintained in accordance with that of a plastic reel such as a No. 7 reel for which the support 13 was originally set. Therefore, regardless of whether the height of the reel support 13 has been originally set with respect to the magnetic head and other elements in terms of a conventional plastic reel, under the use of the adapter, there is no state where the magnetic tape contacts the upper and lower flanges of the No. 10 reel, 15, which is employed by means of the adapter.

As described above, the reel adapter for a No. 10 reel according to the present invention includes a height adjusting board secured to the side margin thereof for lifting the No. 10 reel a slight but certain distance and depending upon the thickness of the height adjusting board, the No. 10 reel is self adjusted to the optimum elevated position. Therefore, it is obvious that there is provided according to the present invention, a reel adapter which is of simple structure but which prevents the occurrence of troubles as would normally occur when the magnetic tape contacts the flange of the No. 10 metal reel or is partially wound up due to the fact that the thickness of the metallic No. 10 reel is less than that of the plastic reel for which the support is originally set.

Although, in the foregoing described embodiment, the doughnut-like board is used as the adjusting member for the metal reels, it is also possible to provide a tongue-like adjusting member and cause it to project from the side margin of the reel adapter rather than a complete circumferential ring as is achieved by the doughnut-like member 11; other than the aforementioned embodiments, the present invention can of course be realized in other forms without departing from the scope of the present invention.

Figure 3:
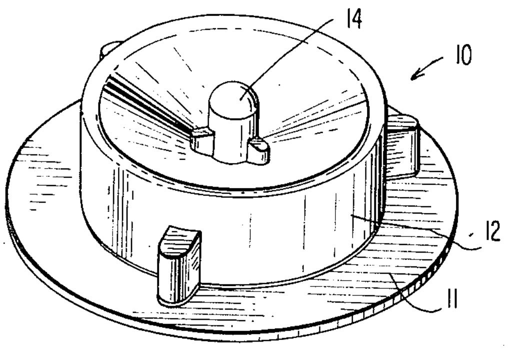
FIG. 3 is a perspective view of the embodiment of the reel adapter illustrated in FIG. 1.
Figure 4:
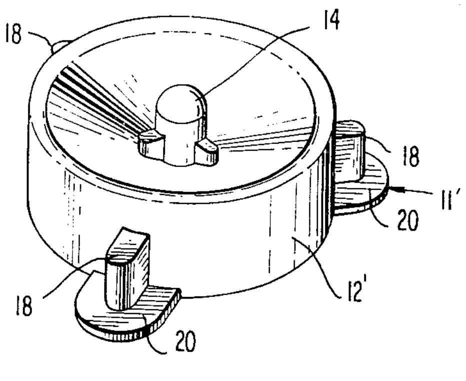
FIG. 4 is a perspective view of yet another embodiment of the reel adapter in accordance with the present invention.

Reference to FIG. 4 illustrates specifically an alternate embodiment in which the height adjusting member 11' which has a thickness corresponding substantially to one-half the difference of the thickness between a plastic reel such as a No. 7 reel and a metallic reel such as a No. 10 reel, for example, is illustrated in the form of three, integral tongues 20 being approximately 1.1 millimeter in thickness and extending radially at three locations circumferentially spaced at 120° and unitary with the adapter body 12' and capable in respect to the embodiment of FIGS. 1–3 inclusive to carry a No. 10 metal reel. In this embodiment, there is no necessity to employ a complete doughnut shaped adapter in terms of the ring 11 secured to the adapter body 12 by adhesive means 19 as illustrated in the first embodiment, but requires only some radially projecting areas to effect the desired height adjustment to the reel carried thereby similar to reel 15 of FIG. 2. Further, the tongues 20 do not have to coincide with radial ribs or projections 18 which locate the reel circumferentially on body 12', the tongues 20 could lie intermediate of projections or ribs 18.

What is claimed is:

1. In a reel adapter for a magnetic tape recorder enabling a metal reel of a diameter not less than 10.5 inches to be coupled to a reel support normally set to accommodate a plastic reel of a diameter of not larger than 7 inches but of greater thickness than the metal reel and to thereby permit magnetic tape to be readily wound thereon and to be unwound therefrom, said reel adapter comprising a disc-like member inserted within the center of the metal reel and having a central opening for receiving the reel support shaft extending upwardly from the reel support, the improvement comprising: a height adjusting means of a thickness of approximately one-half the thickness difference between the metal reel and the plastic reel, said height adjusting means including at least a portion extending radially outward of the reel adapter underlying said metal reel.

2. The reel adapter as claimed in claim 1, wherein said height adjusting means comprises a doughnut-shaped member having an internal diameter on the order of the external diameter of said adapter and means for adhesively coupling said doughnut-shaped member to said adapter such that the reel support contact surfaces of said adapter and said doughnut-shaped member are coplanar.

* * * * *